(12) United States Patent
Siemssen

(10) Patent No.: US 9,710,865 B1
(45) Date of Patent: Jul. 18, 2017

(54) COORDINATING DISTRIBUTED ORDER EXECUTION

(75) Inventor: Bradford W. Siemssen, Federal Way, WA (US)

(73) Assignee: Amazon Technologies, Inc., Seattle, WA (US)

( * ) Notice: Subject to any disclaimer, the term of this patent is extended or adjusted under 35 U.S.C. 154(b) by 638 days.

(21) Appl. No.: 13/209,471

(22) Filed: Aug. 15, 2011

(51) Int. Cl.
*G06Q 30/00* (2012.01)
*G06Q 50/18* (2012.01)
*G06Q 40/04* (2012.01)

(52) U.S. Cl.
CPC .......... *G06Q 50/188* (2013.01); *G06Q 40/04* (2013.01)

(58) Field of Classification Search
CPC ............................. G06Q 17/00; G06Q 30/00
USPC ........................................................ 705/26.1
See application file for complete search history.

(56) References Cited

U.S. PATENT DOCUMENTS

| | | | | | |
|---|---|---|---|---|---|
| 5,165,031 | A | * | 11/1992 | Pruul | G06F 9/466 714/25 |
| 5,261,089 | A | * | 11/1993 | Coleman | G06F 9/466 |
| 5,319,773 | A | * | 6/1994 | Britton | G06F 9/466 714/15 |
| 5,363,505 | A | * | 11/1994 | Maslak | G06F 9/466 709/226 |
| 5,371,889 | A | * | 12/1994 | Klein | G06F 9/466 718/106 |
| 6,269,391 | B1 | * | 7/2001 | Gillespie | 718/100 |
| 6,330,686 | B1 | * | 12/2001 | Denny | G06F 9/466 709/248 |
| 7,013,284 | B2 | * | 3/2006 | Guyan | G06Q 10/06311 705/4 |
| 7,120,651 | B2 | * | 10/2006 | Bamford | G06F 17/3048 |
| 7,181,427 | B1 | * | 2/2007 | DeFrancesco | G06Q 20/10 705/35 |
| 7,430,559 | B2 | * | 9/2008 | Lomet | G06F 17/30864 |

(Continued)

FOREIGN PATENT DOCUMENTS

JP 2008-146304 * 6/2008 .............. G06Q 10/00

OTHER PUBLICATIONS

Spring1, Syer, David p. 1 of 3, Distributed transactions in Spring, with and without XA Seven transaction-processing patterns for Spring applications: Javaworld, 9 pages, dated Jan. 6, 2009.*

(Continued)

*Primary Examiner* — Mark Fadok
(74) *Attorney, Agent, or Firm* — Lee & Hayes, PLLC

(57) ABSTRACT

An order processing system operates in conjunction with external systems to process orders received by an online shopping system. The order processing system maintains execution references that indicate that an external system is performing an action with respect to an item in an order. Each execution reference may store data defining the state of the corresponding execution. The external systems may update the stored state according to a state machine, which may be an acyclic directed graph. The order processing system also maintains an execution registry including data specifying the actions performed by external systems that may not be performed in combination. When a request is received to start an action with respect to an item in an order, the order processing system uses the execution references associated with the item and the execution registry to determine if the request may be granted.

18 Claims, 8 Drawing Sheets

(56) References Cited

U.S. PATENT DOCUMENTS

| | | | |
|---|---|---|---|
| 7,590,810 B2* | 9/2009 | Matsui et al. | 711/162 |
| 7,668,961 B2* | 2/2010 | Lomet | G06F 11/1474 709/230 |
| 7,827,103 B1* | 11/2010 | Fu et al. | 705/40 |
| 7,836,338 B2* | 11/2010 | Tsunakawa | G06F 9/466 707/610 |
| 7,885,900 B1* | 2/2011 | Bender | 705/317 |
| 8,083,137 B2* | 12/2011 | Tannenbaum | 235/380 |
| 8,122,427 B2* | 2/2012 | Chrysanthakopoulos | G06F 8/20 709/201 |
| 8,161,538 B2* | 4/2012 | Kausik | 726/11 |
| 8,266,044 B2* | 9/2012 | Kaminsky | G06Q 40/025 705/37 |
| 8,285,646 B2* | 10/2012 | Kinsley | 705/59 |
| 8,650,214 B1* | 2/2014 | Wilhelm | 707/782 |
| 8,676,943 B1* | 3/2014 | Parthasarathy | G06F 9/5061 709/221 |
| 8,768,658 B1* | 7/2014 | Ciolfi | G06F 17/5009 703/2 |
| 2002/0046352 A1* | 4/2002 | Ludwig | 713/201 |
| 2002/0152395 A1* | 10/2002 | Zhang et al. | 713/200 |
| 2004/0148289 A1* | 7/2004 | Bamford | G06F 17/30377 |
| 2004/0172463 A1* | 9/2004 | King et al. | 709/223 |
| 2004/0205006 A1* | 10/2004 | Kanai | G06Q 30/06 705/26.81 |
| 2004/0226019 A1* | 11/2004 | Tucker et al. | 719/310 |
| 2004/0240444 A1* | 12/2004 | Matthews | H04L 12/5885 370/389 |
| 2005/0079873 A1* | 4/2005 | Caspi et al. | 455/456.1 |
| 2005/0086302 A1* | 4/2005 | Aggarwal et al. | 709/204 |
| 2006/0080670 A1* | 4/2006 | Lomet | G06F 11/1474 719/314 |
| 2007/0067266 A1* | 3/2007 | Lomet | G06F 17/30864 |
| 2007/0112629 A1* | 5/2007 | Solomon et al. | 705/14 |
| 2007/0174815 A1* | 7/2007 | Chrysanthakopoulos | H04L 67/02 717/120 |
| 2007/0226705 A1* | 9/2007 | Lomet | G06F 9/466 717/133 |
| 2007/0294697 A1* | 12/2007 | Theimer | G06F 9/5027 718/102 |
| 2008/0005220 A1* | 1/2008 | Tsunakawa | G06F 9/466 709/201 |
| 2008/0098044 A1* | 4/2008 | Todd | G06F 17/30578 |
| 2008/0234046 A1* | 9/2008 | Kinsley | 463/40 |
| 2008/0250074 A1* | 10/2008 | Parkinson | G06F 11/1474 |
| 2008/0300925 A1* | 12/2008 | Benson | G06Q 10/02 705/5 |
| 2009/0094243 A1* | 4/2009 | Oshri et al. | 707/8 |
| 2009/0217274 A1* | 8/2009 | Corbin | G06F 9/466 718/101 |
| 2010/0042819 A1* | 2/2010 | Miyata | 712/233 |
| 2010/0185772 A1* | 7/2010 | Wang et al. | 709/227 |
| 2010/0191713 A1* | 7/2010 | Lomet | G06F 17/30362 707/704 |
| 2011/0078123 A1* | 3/2011 | Busch | G06F 9/466 707/690 |
| 2011/0219192 A1* | 9/2011 | Hutchison | G06F 11/1458 711/135 |
| 2012/0297360 A1* | 11/2012 | Lucco | G06F 8/30 717/108 |

OTHER PUBLICATIONS

Spring2, Syer, David, p. 2 of 3, Distributed transactions in Spring, with and without XA Seven transaction-processing patterns for Spring applications: Javaworld, 8 pages, dated Jan. 6, 2009.*

Spring3, Syer, David, p. 3 of 3, Distributed transactions in Spring, with and without XA Seven transaction-processing patterns for Spring applications: Javaworld, 8 pages, dated Jan. 6, 2009.*

Leu, Yungho, An Extended Transaction Model for Multidatabase Systems, Purdue e-Pubs, 25 pages, dated, Oct. 1989.*

* cited by examiner

COORDINATING DISTRIBUTED ORDER EXECUTION

BACKGROUND

An online merchant may provide a large number of items for sale to customers over the Internet. In order to provide this functionality, an online merchant typically operates a merchant system that provides a World Wide Web ("Web") site or other type of user interface to customers. Customers may access information regarding available products and order products through the Web site or other type of user interface provided by the merchant system.

Once a customer has ordered one or more items from an online merchant, a significant amount of processing must typically occur in order to charge the customer for the purchase and to cause the ordered items to be delivered to the customer. For instance, various systems operating within or in conjunction with a merchant system might perform processing following the receipt of a customer order for detecting fraud, computing sales tax and shipping charges, performing accounting functions, processing a credit card or another type of payment instrument, initiating packing and shipment of the ordered items, tracking the shipment of the ordered items, communicating with the customer regarding the status of their order, and other functions. A mechanism must also be utilized to coordinate the performance of these functions by the participating systems.

Coordinating the operation of the systems responsible for performing the order processing, payment, and fulfillment functions described above typically requires storing information specific to the actions of each system involved in processing an order. Storing this information often involves the use of a distributed system of multiple databases. A transaction manager system and/or a two-phase database commit protocol are also typically utilized to keep the distributed databases and systems consistent and synchronized. Transaction manager systems and other systems utilizing a two-phase database commit protocol can, however, be difficult to scale and maintain.

It is with respect to these and other considerations that the disclosure made herein is presented.

DETAILED DESCRIPTION

Figure 1:
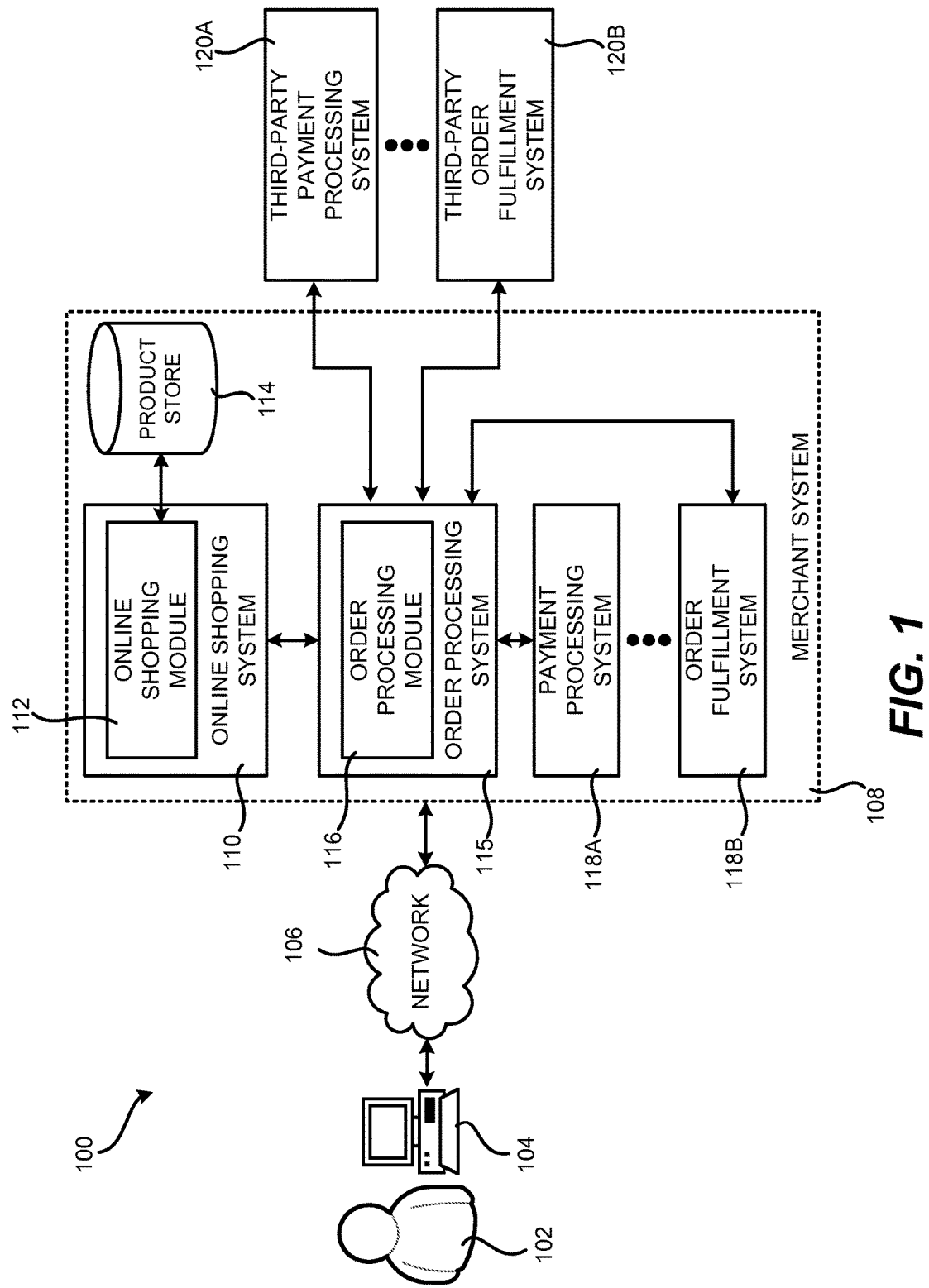
FIG. 1 is a system diagram showing one illustrative operating environment for the embodiments disclosed herein for coordinating distributed order execution.

The following detailed description is directed to technologies for coordinating distributed order execution. Through an implementation of the concepts and technologies disclosed herein, the distributed operations of various systems that perform order processing, payment, and fulfillment functions can be synchronized without the use of a transaction manager system or a two-phase database commit protocol. Additionally, new systems can be easily integrated, thereby permitting the mechanisms described herein to scale more easily than systems utilizing a transaction manager and/or a two-phase database commit protocol.

According to aspects presented herein, a merchant system is provided that includes an online shopping system for providing online shopping functionality. The merchant system also includes an order processing system that operates in conjunction with the online shopping system to process and fulfill orders received from customers by the online shopping system. The order processing system, in turn, operates in conjunction with one or more other systems (referred to herein as "external systems") that perform various order processing functions. The term "external" means that the other systems are external to the order processing system, not external to the merchant system.

The external systems may include systems for detecting fraud, computing sales tax and shipping charges, performing accounting functions, processing a credit card or another type of payment instrument, initiating packing and shipment of ordered items, tracking the shipment of ordered items, communicating with the customer regarding the status of their order, and/or other functions. The external systems may be operated within the merchant system itself by the operator of the merchant system, or may be operated external to the merchant system by one or more third-parties.

The external systems perform "executions" with respect to items in an order. As utilized herein, the term execution refers to any action taken by an external system that depends on one or more attributes for one or more items in an order and that limits what other actions can be taken concurrently by other external systems. An execution may be pending and will be completed or canceled. An execution, once completed, is also immutable and irreversible. Examples of executions that might be performed by external systems include, but are not limited to, shipping an item, a digital fulfillment system enabling the download of a purchased item, charging a customer for the payment of an item, a customer canceling an item from an order, initiating an in-store pickup process, and a service activation. The external systems might also perform other types of executions.

The order processing system also provides a mechanism to coordinate the executions performed by the various external systems. In particular, the order processing system is configured to track and limit the executions that can take place in combination with respect to an item in an order. For instance, utilizing the mechanisms described herein, the order processing system may prohibit an external system from canceling an order once another external system has indicated that the item has been shipped. Additionally, the order processing system may be further configured to limit the modification of attributes associated with an item in an order when certain executions are taking place. For instance, an external system may be prohibited from modifying a delivery address associated with an ordered item once the item has been shipped. Other types of operations performed by external systems might also be prohibited utilizing the mechanisms disclosed herein.

In order to coordinate executions and limit the modification of attributes, the order processing system creates and maintains execution references for the executions that occur with respect to each item in each order. An execution reference is stored data that identifies a state of an execution and a type of the execution for an item in an order. For instance, an execution reference might indicate that a payment execution (execution type) has been completed (execution state) for a particular item in an order. The execution references might also provide a unique identifier for the execution, which may be referred to herein as an execution identifier ("ID"). The execution ID might also identify the external system that is performing the corresponding execution. Execution references may be stored for a set period of time following the fulfillment of an order or indefinitely.

In order to coordinate executions and limit the modification of item attributes, the order processing system also utilizes an execution registry. The execution registry contains data that defines one or more executions that are not permitted for one or more combinations of an execution type and an execution state. In particular, according to one embodiment, the execution registry stores, for one or more execution types and states, data defining the executions that may not be started and data defining the attributes that may not be modified. Because rules set forth in the execution registry are declaratively defined, new rules for new external systems may be easily defined and implemented.

When the order processing system receives a request from an external system to start an execution or to modify an attribute associated with an item in an order, the order processing system utilizes the execution references associated with the item and the execution registry to determine if the request can be granted. If the request can be granted, the order processing system responds by allowing the execution to be started or by allowing the attribute to be modified. In the case of an execution, the order processing system also creates a new execution reference associated with the item that identifies the state and type of the newly started execution.

According to embodiments, the external systems are configured to periodically update the state of their execution that is stored in the execution references. For instance, the state of an execution for a particular item may change from pending to canceled or completed. As the state changes, the appropriate external system is configured to modify the execution state in the appropriate execution reference for the item. The external systems operate in conjunction with the order processing system to update the execution state. In one embodiment, the execution state is updated according to a state machine. The state machine may be an acyclic directed graph.

It should be appreciated that although the subject matter disclosed herein is primarily presented in the context of coordinating the distributed execution of systems involved in order processing, the concepts and technologies disclosed herein might also be utilized to coordinate the distributed operation of other types of systems. It should also be appreciated that the subject matter presented herein may be implemented as a computer process, a computer-controlled apparatus, a computing system, or an article of manufacture, such as a computer-readable storage medium. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, electronic book readers, wireless telephone devices, special-purpose hardware devices, network appliances, or the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

FIG. 1 and the following description are intended to provide a brief, general description of a suitable computing environment in which the embodiments described herein may be implemented. In particular, FIG. 1 is a system and network diagram that shows an illustrative operating environment 100 including several hardware and software components for coordinating distributed order execution. As discussed above, the environment 100 is merely illustrative and the embodiments disclosed herein might be utilized in many different types of environments.

The environment 100 includes one or more customers, such as the customer 102, that use computers, such as the customer computer 104, to access a merchant system 108 through a network 106. The customer 102 may be an individual or entity that desires to browse, purchase, or has purchased, one or more products from the online merchant that operates the merchant system 108. The customer computer 104 may be a personal computer ("PC"), desktop workstation, laptop computer, tablet computer, notebook computer, personal digital assistant ("PDA"), electronic-book reader, game console, set-top box, consumer electronics device, server computer, or any other type of computing device capable of connecting to the network 106 and communicating with the merchant system 108.

The network 106 may be a local-area network ("LAN"), a wide-area network ("WAN"), the Internet, or any other networking topology known in the art that connects the customer computer 104 to the merchant system 108. The merchant system 108 may include a number of application servers that provide various online shopping services to the customer computer 104 over the network 106. The customer 102 may use a client application (not shown) executing on the customer computer 104 to access and utilize the online shopping services provided by the merchant system 108.

In one embodiment the client application is a World Wide Web ("Web") browser application, such as the MOZILLA® FIREFOX® Web browser from MOZILLA FOUNDATION of Mountain View, Calif. The Web browser application exchanges data with the merchant system 108 using the hypertext transfer protocol ("HTTP") over the network 106. The client application might also be a stand-alone client application configured for communicating with the merchant system 108. The client application might also utilize any number of communication methods known in the art to communicate with the merchant system 108 across the network 106, including remote procedure calls, SOAP-based Web services, remote file access, proprietary client-server architectures, and the like.

The merchant system 108 may include multiple subsystems that together provide online shopping services and perform the additional functionality disclosed herein for order processing and fulfillment and distributed order execution. In this regard, the various systems operating within the merchant system 108 may execute a number of software components in order to provide the online shopping services and the other functionality disclosed herein to the customer computer 104. The software components may execute on a single application server or in parallel across multiple application servers in the merchant system 108. In addition, each software component may consist of a number of subcomponents executing on different application servers or other computing devices in the merchant system 108. Various components may be implemented as software, hardware, or any combination of the two.

According to one embodiment, an online shopping module 112 executes on an online shopping system 110. The online shopping module 112 provides functionality for the customer 102 to browse and purchase products available from the online merchant that operates the merchant system 108. For instance, the online shopping module 112 may receive a browse request from the customer 102 and, in response thereto, retrieve information regarding a particular product offered for sale by the online merchant from a product store 114 and referenced by the browse request, generate product details containing the product information, and transmit the product details over the network 106 to the client application executing on the customer computer 104 for display to the customer 102. Information regarding each product offered for sale might be stored in a product store 114 maintained by the merchant system 108. The online shopping module 112 is also configured to receive an order for one or more items from the customer 102.

According to various embodiments, a multitude of other systems are provided within the merchant system 108 in order to assist the online shopping module 112 with the performance of various functions. For instance, in the environment 100 shown in FIG. 1, an order processing system 115 is provided that operates in conjunction with the online shopping system 110 to process orders received from customers, such as the customer 102. The order processing system 115 executes an order processing module 116 to provide the order processing functionality disclosed herein. As will be described in greater detail below, the order processing module 116 is also configured to provide the functionality described herein for coordinating distributed order execution.

The order processing system 115 operates in conjunction with one or more other systems 118A-118B and 120A-120B (referred to herein collectively as "external systems") that perform various distributed order processing functions. The external systems may include a payment processing system 118A for processing payments and an order fulfillment system 118B for coordinating the delivery of ordered items. The systems 118A-118B are operated within the merchant system 108. It should be appreciated, however, that the order processing module 116 might also operate in conjunction with other systems 120A-120B that operate outside the merchant system 108. For instance, the order processing module 116 might also operate in conjunction with a third-party payment processing system 120A and a third-party order fulfillment system 120B.

It should be appreciated that the external systems 118A-118B and 120A-120B are only examples of the many different types of systems that might operate in conjunction with the online shopping module 112 and the order processing system 115. Other types of systems that might be utilized include a fraud detection system to detect and address fraudulent activity occurring within the merchant system 108, an inventory management system for monitoring the product store 114 and replenishing product inventory as necessary, and systems for providing other types of services relating to an order. It should be appreciated that these systems are merely illustrative and that the merchant system 108 might utilize many additional and different types of systems in conjunction with the provision of the online shopping services and related functionality described herein.

As will be discussed in greater detail herein, the external systems perform "executions" with respect to items in orders placed by customers of the merchant system 108. As indicated above, the term execution refers to any action taken by an external system that depends on one or more attributes for one or more items in an order and that limits what other actions can be taken concurrently by other external systems. An execution may be pending and will be completed or canceled. An execution, once completed, is also immutable and irreversible. Examples of executions that might be performed by external systems include, but are not limited to, shipping an item, a digital fulfillment system enabling the download of a purchase item, charging a customer for the payment of an item, a customer canceling an item from an order, initiating an in-store pickup process, and a service activation. The external systems might also perform other types of executions.

It should be appreciated that each of the external systems may store and maintain data relating to the executions that it performs. This data may be stored in various formats utilizing various database technologies and systems. Utilizing the mechanisms described herein, it may be unnecessary for the order processing system 115 to have access to the data stored by each of the external systems regarding the various executions.

As discussed briefly above, the order processing system 115 also provides a mechanism to coordinate the executions performed by the various external systems 118A-118B and 120A-120B. In particular, the order processing system 115 is configured to track and limit the executions that can take place in combination with respect to an item in an order. Additional details regarding the operation of the order processing system 115 in this regard will be provided below with respect to FIGS. 2-6B.

Figure 2:
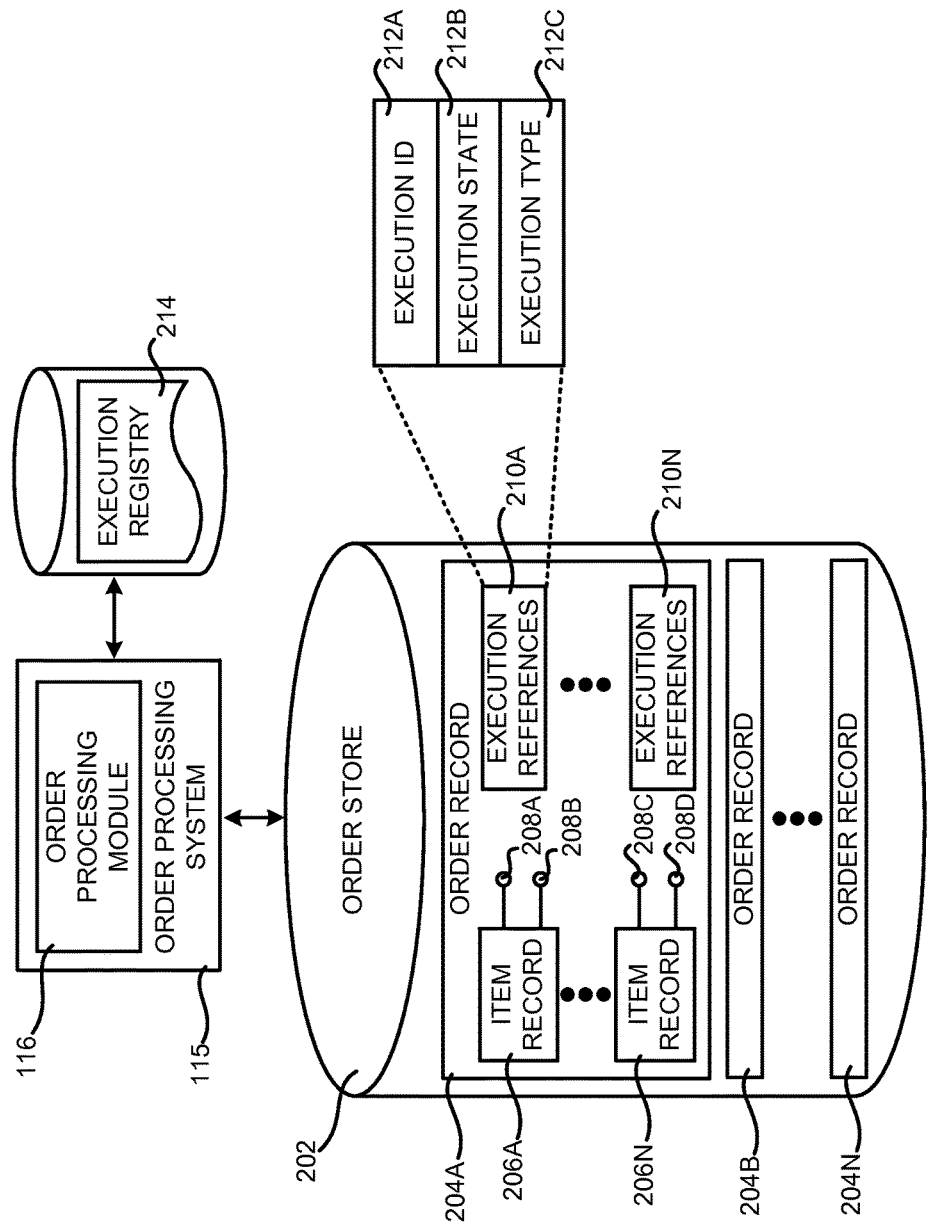
FIG. 2 is a system diagram showing aspects of the operation of an order processing system utilized in embodiments herein to coordinate distributed order execution.

FIG. 2 is a system diagram showing additional aspects of the operation of an order processing system 115 utilized in embodiments herein to coordinate distributed order execution. As shown in FIG. 2, the order processing system 115 maintains or has access to an order store 202 that stores details regarding orders received by the online shopping module 110. In particular, the order store 202 may include order records 204A-204N corresponding to individual orders received at the online shopping module 110.

Each of the order records 204A-204N includes one or more item records 206A-206N corresponding to the individual items in an order. A separate item record 206 is created for each item in an order. Each item record 206 may include attributes 208 providing data about the ordered item, such as the identity of the item, data indicating whether the item is a digital or physical good, a shipping address and billing address for the item, data indicating whether the item should be gift wrapped, data indicating the type of shipping mechanism that should be utilized, and other information pertinent to each item. In the example shown in FIG. 2, the item record 206A includes the attributes 208A-208B and the item record 206B includes the attributes 206C-206D.

The order store 202 also includes one or more execution references 210 for each item record 206A in an order record 204A. For instance, in the example shown in FIG. 2, the item record 206A has the execution references 210A associated therewith and the item record 206N has the execution references 210N associated therewith.

As described briefly above, an execution reference 210 is stored data that identifies a state of an execution performed by an external system and a type of the execution for an item in an order. For instance, an execution reference 210A might indicate that a payment execution (execution type) has been completed (execution state) for a particular item in an order.

In one embodiment, each execution reference 210 includes a field 212C storing data indicating the type of the execution, a field 212B storing data indicating the state 212B of the execution, and a field 202A including data defining an execution ID for an execution. As discussed briefly above, an execution ID provides a unique identifier for the execution. The execution ID might also identify the external system that is performing the corresponding execution. The order processing system 115 may store the execution references 210A-210N for a set period of time following the fulfillment of an item in an order or indefinitely.

In order to coordinate executions performed by external systems, and to limit the modification of item attributes 208 by external systems, the order processing system 115 also utilizes an execution registry 214. The execution registry 214 contains data that defines one or more executions that are not permitted for one or more combinations of an execution type and an execution state. In particular, according to one embodiment, the execution registry 214 stores, for one or more execution types and states, data defining the executions that may not be started ("execution exclusions") and data defining the attributes that may not be modified ("change exclusions"). One illustrative execution registry 214 will be described below with regard to FIG. 4.

When the order processing system 115 receives a request from an external system to start an execution or to modify an attribute associated with an item in an order, the order processing system 115 utilizes the execution references 210 associated with the item and the execution registry 214 to determine if the request can be granted. If the request can be granted, the order processing system 115 responds by allowing the execution to be started or by allowing the attribute to be modified. In the case of an execution, the order processing system 115 also creates a new execution reference 210 associated with the item that identifies the state and type of the newly started execution. Additional details regarding this process will be provided below with regard to FIGS. 5-6B.

According to embodiments, the external systems are configured to periodically update the state of their execution that is stored in the execution references 210. For instance, the state of an execution for a particular item may change from pending to canceled or completed. As the state changes, the appropriate external system is configured to modify the execution state in the appropriate execution reference 210 for the item. The external systems operate in conjunction with the order processing system 115 to update the execution state. In one embodiment, the execution state is updated according to a state machine. The state machine may be an acyclic directed graph. One example of such a state machine is shown in FIG. 3 and will be described in greater detail below.

Figure 3:
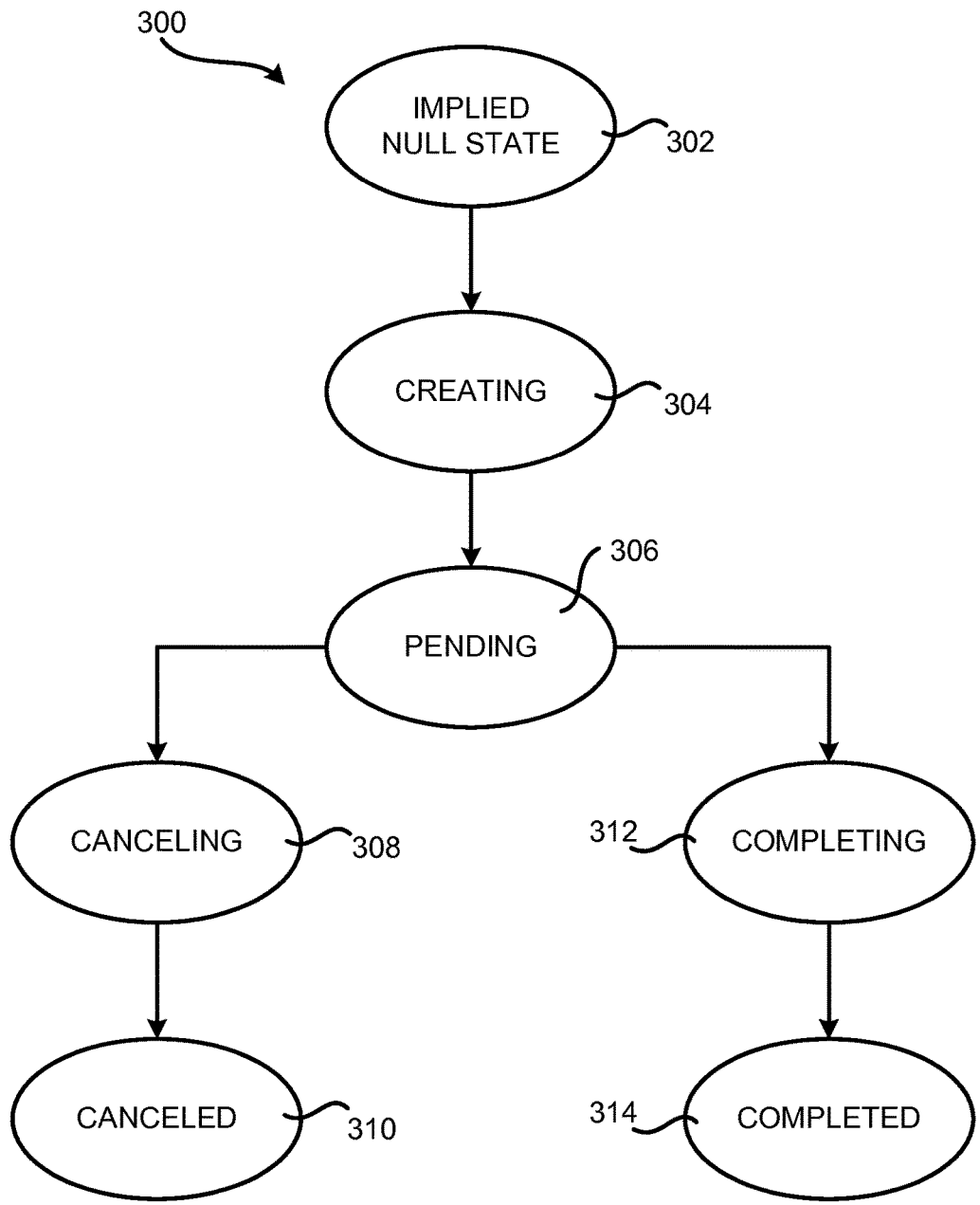
FIG. 3 is a state diagram showing one example of a state machine that may be utilized in embodiments herein to specify the state of an execution performed by a system operating in conjunction with an order processing system.

FIG. 3 is a state diagram showing one example of a state machine 300 that may be utilized in embodiments herein to specify the state of an execution performed by an external system operating in conjunction with the order processing system 115. As discussed above, the external systems are configured to periodically update the state of their execution that is stored in the execution references 210 until the execution has been canceled or has completed. In one embodiment, each of the external systems utilizes the state machine 300 shown in FIG. 3 to update its state with respect to an execution for an item. The external systems may update the state of an execution each time a state change is made.

The state machine 300 begins at state 302, which is an implied null state. When a new execution is started by an external system, the state machine 300 moves from state 302 to state 304. State 304 indicates that the external system is creating a new execution. Once the new execution has been created, the state machine 300 proceeds from state 304 to state 306. Once the state machine 300 has reached either state 310 or state 314, no additional movement between states is permitted.

State 306 indicates that an execution is pending at the external system. While an execution is pending at the external system, the execution may complete or the execution may be canceled. If the execution is canceled, the state machine 300 proceeds from state 306 to state 308, which indicates that the execution is being canceled. From state 308, the state machine 300 proceeds to state 310, which indicates that the execution has been canceled.

If the execution completes, the state machine 300 proceeds from state 306 to state 312, which indicates that the execution is completing. Once the execution has completed, the state machine 300 moves to state 314, which indicates that the execution has been completed.

It should be appreciated that the state machine 300 shown in FIG. 3 is a directed acyclic graph. A directed acyclic graph is a directed graph with no directed cycles. That is, it is formed by a collection of vertices and directed edges, each edge connecting one vertex to another, such that there is no way to start at a particular vertex and follow a sequence of edges that eventually loops back to the same vertex again. It should also be appreciated that the state machine 300 illustrated in FIG. 3 is merely illustrative and that other types of state machines might be utilized to update the current state of executions being performed by the external systems.

Figure 4:
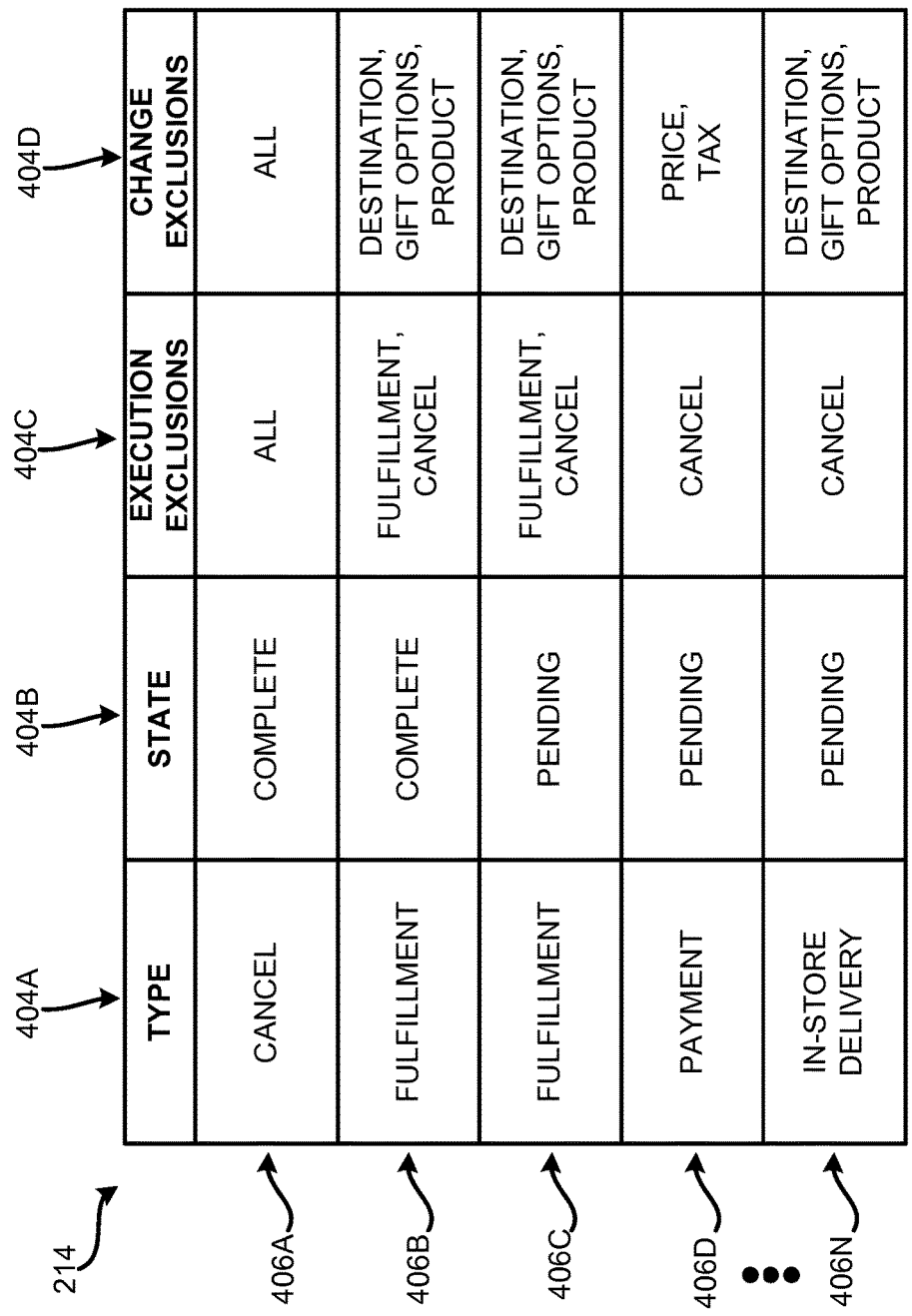
FIG. 4 is a data structure diagram showing the format of an illustrative execution registry utilized in embodiments herein to determine if an execution performed by a system operating in conjunction with an order processing system may be permitted to begin.

FIG. 4 is a data structure diagram showing the format of an illustrative execution registry 214 utilized in embodiments herein to determine if an execution performed by a system operating in conjunction with an order processing system 115 may be permitted to begin. The example execution registry 214 shown in FIG. 4 includes four columns 404A-404D. The column 404A is utilized to store data identifying an execution type. For example, in the illustrative execution registry 214 shown in FIG. 4, the row 406A corresponds to an execution having a type named "cancel,"

the rows 406B-406C correspond to executions having the type "fulfillment," the row 406D corresponds to a "payment" execution type, and the row 406N corresponds to an "in-store delivery" execution type. Other execution types might also be specified.

The column 404B of the example execution registry 214 is utilized to store data identifying an execution state. For instance, the rows 406A-406B indicate that the corresponding execution is complete while the rows 406C-406N indicate that the corresponding execution is pending. The states identified in the column 404B correspond to states in the state machine 300 described above with regard to FIG. 3. It should be appreciated that the data stored in columns 404A-404B together define the current state of a particular execution type.

The column 404C is utilized to specify the execution exclusions mentioned above. In particular, the column 404C is utilized to store data identifying any executions that are not permitted to start when an execution reference includes an execution having the combination of execution type and execution state set forth in the columns 404A-404B, respectively. For instance, in the example shown in FIG. 4, no executions may be started if a cancel execution has been completed (row 406A), fulfillment and cancel executions may not be started if a fulfillment execution is pending or has been completed (rows 406B-406C), and a cancel execution may not be started if a payment execution is pending (row 406D) or if an in-store delivery execution is pending (row 406N). It should be appreciated that these examples are merely illustrative and that other types of execution exclusions might also be specified.

The column 404D is utilized to specify the change exclusions mentioned above. In particular, the column 404D is utilized to store data identifying any attributes of an item that cannot be modified when an execution reference includes an execution having the combination of execution type and execution state set forth in the columns 404A-404B, respectively. For instance, in the example shown in FIG. 4, no attributes may be modified if a cancel execution has been completed (row 406A), attributes identifying product, destination, and gift options may not be modified if a fulfillment execution has completed (row 406A), if fulfillment is pending (row 406C), or if in-store delivery is pending (406N). Similarly, attributes corresponding to a product price and applicable tax may not be modified if a payment execution is pending for the item (row 406D). It should be appreciated that these examples are merely illustrative and that other types of changes exclusions might also be specified.

As discussed above, the order processing system 115 utilizes the contents of the execution registry 214 and the execution references 210 associated with the item to determine whether a request to begin a new execution or a request to modify an attribute associated with an item may be granted. Additional details regarding this process will be provided below with regard to FIGS. 5 and 6A-6B.

Figure 5:
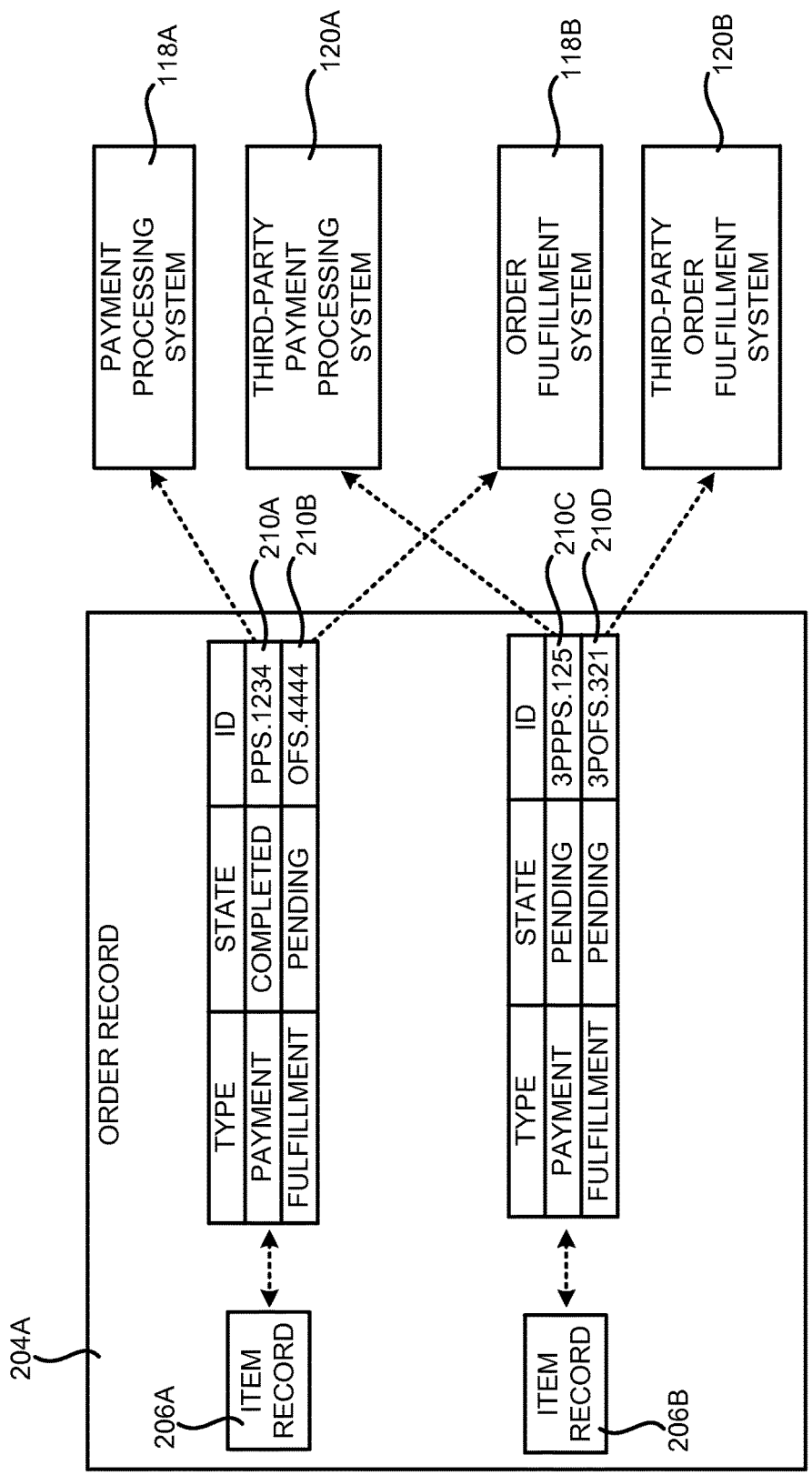
FIG. 5 is a data structure diagram showing an illustrative order record that contains item records for the items in an order along with several execution references associated with the item records.

FIG. 5 is a data structure diagram showing an illustrative order record 204A that contains item records 206A-206B for the items in an order, along with several execution references 210A-210D associated with the item records 206A-206B, respectively. As discussed above, each item record 206 in an order record 204 may have one or more execution references 210 associated therewith.

In the example shown in FIG. 5, for instance, the item record 206A has two associated execution references 210A-210B. The execution reference 210A corresponds to a completed payment execution performed by the payment processing system 118A. The execution reference 210B corresponds to a pending fulfillment execution being performed by the order fulfillment system 118B.

The item record 206B shown in FIG. 5 also has two associated execution references 210C-210D. The execution reference 210C indicates that a payment execution is pending with the third-party payment processing system 120A. The execution reference 210D indicates that fulfillment is also pending with the third-party order fulfillment system 120B.

As discussed above, the execution references 210 and the execution registry 214 are utilized to determine whether a request to start an execution or a request to modify an attribute of an item record can be granted. For instance, using the example execution registry 214 shown in FIG. 4 and the execution references 210A-210D shown in FIG. 5, a request to cancel the item associated with the order record 206A would be denied. This is because the row 406C in the execution registry 214 indicates that a cancel execution cannot be started when a fulfillment execution is pending. The execution reference 210B indicates that fulfillment is pending for the item associated with the item record 206A.

As another example, a request to modify the price or the associated tax for the item corresponding to the item record 206B would also be denied by the order processing module 116. This is because the row 406D in the execution registry 214 indicates that the attributes indicating the price and tax of an item cannot be modified if a payment execution is pending. Because the execution reference 210C indicates that a payment execution is pending, a request to modify these attributes will be denied.

It should be appreciated that the item records 206A and the corresponding execution references 210A-210D shown in FIG. 5 are merely illustrative and that an actual item record 206 might have more or fewer execution references associated therewith. Additional details regarding the operations performed by the order processing module 116 to coordinate the distributed order execution performed by the external systems will be provided below with regard to FIGS. 6A-6B.

Figure 6A:
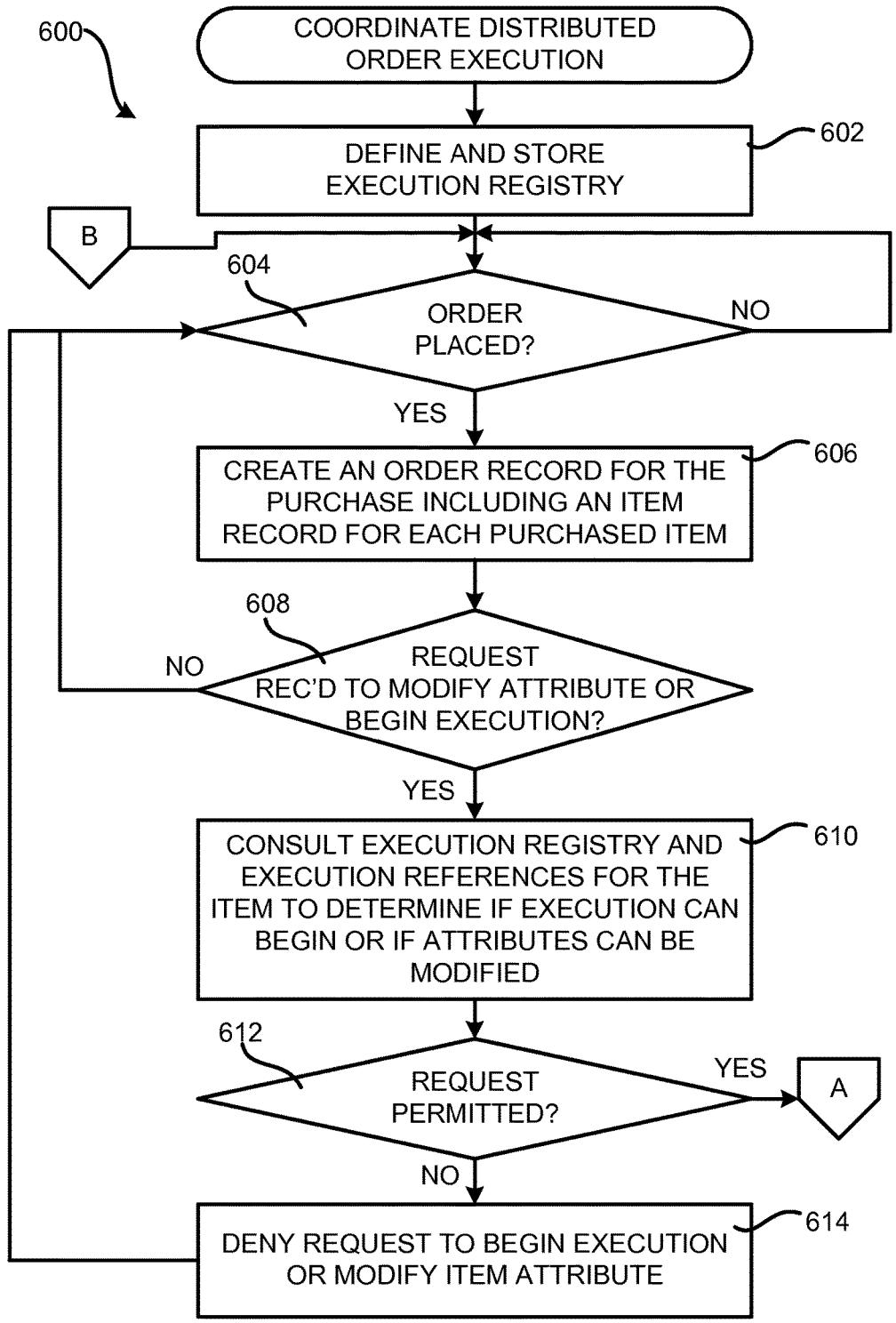
FIGS. 6A-6B are flow diagrams showing one illustrative routine for coordinating distributed order execution according to one embodiment disclosed herein.
Figure 6B:
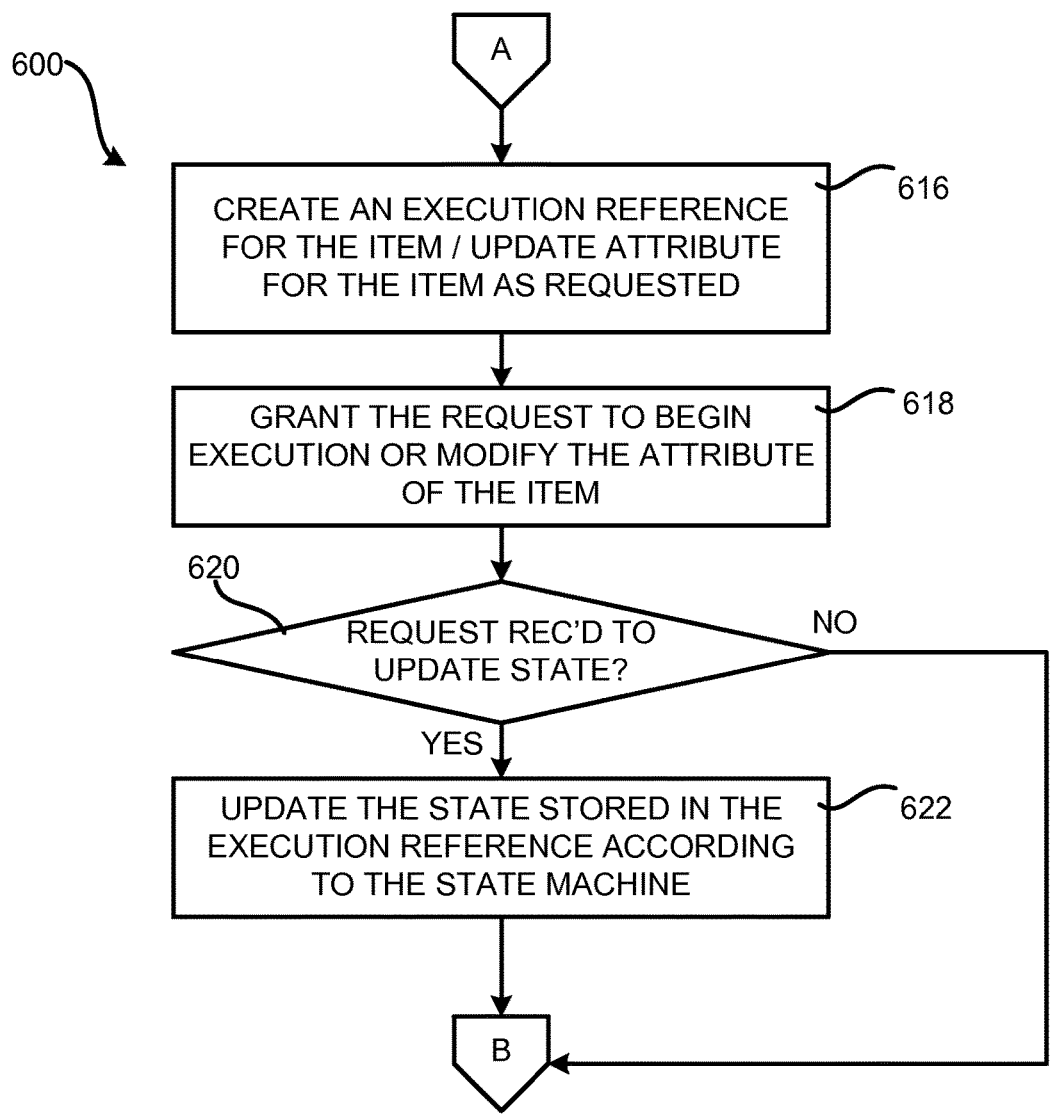

Turning now to FIGS. 6A-6B, additional details will be provided regarding the operation of the order processing system 115 for coordinating distributed order execution. In particular, FIGS. 6A-6B are flow diagrams showing one illustrative routine 600 performed by the order processing module 116 for coordinating distributed order execution according to one embodiment disclosed herein.

It should be appreciated that the logical operations described herein with reference to FIGS. 6A-6B and the other FIGURES are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein with reference to the various FIGURES are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

The routine 600 begins at operation 602, where the execution registry 214 is defined and stored. It should be appreciated that the execution registry 214 may be periodically updated to modify the rules defined therein and to add support for additional execution types and states. From operation 602, the routine 600 proceeds to operation 604.

At operation 604, the order processing module 116 determines if an order has been placed at the online shopping module 112. If so, the routine 600 proceeds to operation 606, where the order processing module 116 creates an order record 204A for the order that includes an item record 206 for each of the items in the purchase. It should be appreciated that another component, such as the online shopping module 112, may create the order record 204 and the item records 206. From operation 606, the routine 600 proceeds to operation 608.

At operation 608, the order processing module 116 determines if a request has been received from an external system to begin an execution or to modify an attribute associated with an item. If such a request is received, the routine 600 proceeds from operation 608 to operation 610. If such a request is not received, the routine 600 proceeds back to operation 604, described above.

At operation 610, the order processing module 116 consults the execution registry 214 and the execution references for the appropriate item to determine whether the request to start an execution or modify an attribute can be granted. As discussed above with regard to FIG. 5, the order processing module 116 performs this task by comparing the requested execution or attribute change to the execution registry 214 and the execution references 210 for the item. If the request can be granted, the routine 600 proceeds from operation 612 to operation 616. If the request cannot be granted, the routine 600 proceeds from operation 612 to operation 614, where the request is denied. From operation 614, the routine 600 proceeds back to operation 604, described above.

At operation 616, the order processing module 116 creates a new execution record 210 for the request if the request received at operation 608 is a request to start a new execution. If the request received at operation 608 is a request to modify attributes of an item record 206, the order processing module 116 modifies the attributes as requested at operation 616.

From operation 616, the routine 600 proceeds to operation 618 where the request to start an execution or modify an attribute is granted by the order processing module 116. The order processing module 116 may transmit an appropriate message indicating that the request has been granted to the external system that made the request.

As discussed above, the external systems may periodically update the execution state set forth in an execution reference 210 according to a state machine, such as the state machine 300 shown in FIG. 3 and described above. If the order processing module 116 receives a request to update the state of an execution, the routine 600 proceeds from operation 620 to operation 622. At operation 622, the execution state is updated in the appropriate execution reference 210 according to the state machine 300. The routine 600 then proceeds from operation 622 to operation 604, discussed above.

Figure 7:
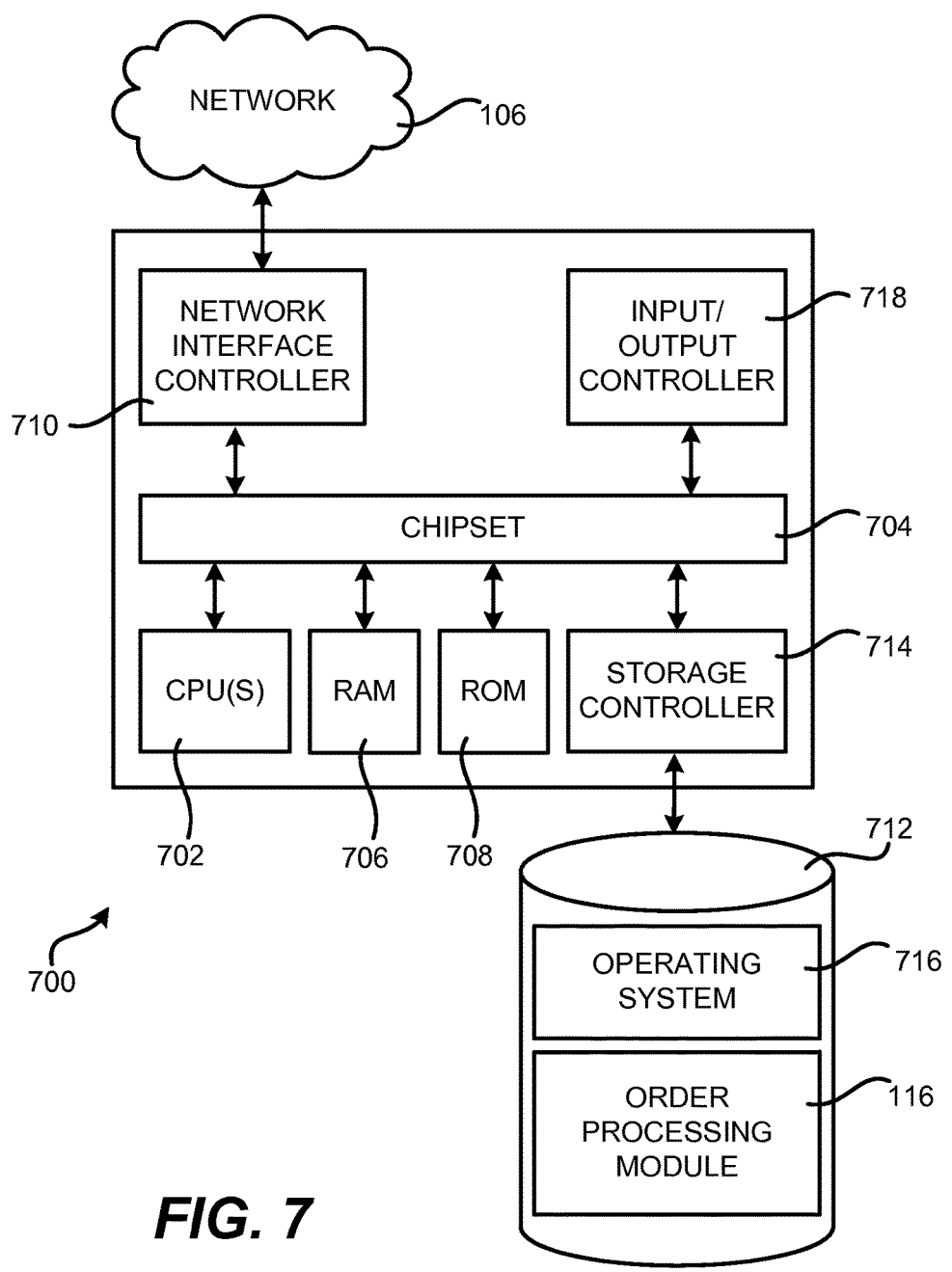
FIG. 7 is a computer architecture diagram showing one illustrative computer hardware architecture for use in computing devices configured to implement the concepts and technologies disclosed herein in one embodiment.

FIG. 7 shows an example computer architecture for a computer 700 capable of executing the software components described herein for coordinating distributed order execution in the manner presented above. The computer architecture 700 shown in FIG. 7 illustrates a conventional server computer, workstation, desktop computer, laptop, PDA, electronic book reader, digital wireless phone, tablet computer, network appliance, set-top box, or other computing device, and may be utilized to execute any aspects of the software components presented herein described as executing within the merchant system 108, the customer computer 104, the external systems, or other computing platform.

The computer 700 includes a baseboard, or "motherboard," which is a printed circuit board to which a multitude of components or devices may be connected by way of a system bus or other electrical communication paths. In one illustrative embodiment, one or more central processing units ("CPUs") 702 operate in conjunction with a chipset 704. The CPUs 702 are standard programmable processors that perform arithmetic and logical operations necessary for the operation of the computer 700.

The CPUs 702 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The chipset 704 provides an interface between the CPUs 702 and the remainder of the components and devices on the baseboard. The chipset 704 may provide an interface to a random access memory ("RAM") 706, used as the main memory in the computer 700. The chipset 704 may further provide an interface to a computer-readable storage medium such as a read-only memory ("ROM") 708 or non-volatile RAM ("NVRAM") for storing basic routines that that help to startup the computer 700 and to transfer information between the various components and devices. The ROM 708 or NVRAM may also store other software components necessary for the operation of the computer 700 in accordance with the embodiments described herein.

According to various embodiments, the computer 700 may operate in a networked environment using logical connections to remote computing devices and computer systems through a network, such as a local-area network ("LAN"), a wide-area network ("WAN"), the Internet, or any other networking topology known in the art that connects the computer 700 to remote computers. The chipset 704 includes functionality for providing network connectivity through a network interface controller ("NIC") 710, such as a gigabit Ethernet adapter. For example, the NIC 710 may be capable of connecting the computer 700 to other computing devices, such as merchant system 108, the customer computer 104, a data storage system in the merchant system 108, and the like, over the network 106 described above in regard to FIG. 1. It should be appreciated that multiple NICs 710 may be present in the computer 700, connecting the computer to other types of networks and remote computer systems.

The computer 700 may be connected to a mass storage device 712 that provides non-volatile storage for the computer. The mass storage device 712 may store system programs, application programs, other program modules, and data, which have been described in greater detail herein. The mass storage device 712 may be connected to the computer 700 through a storage controller 714 connected to the chipset 704. The mass storage device 712 may consist of one or more physical storage units. The storage controller 714 may interface with the physical storage units through a serial attached SCSI ("SAS") interface, a serial advanced technology attachment ("SATA") interface, a FIBRE CHANNEL ("FC") interface, or other standard interface for physically connecting and transferring data between computers and physical storage devices.

The computer 700 may store data on the mass storage device 712 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 712 is characterized as primary or secondary storage, or the like. For example, the computer 700 may store information to the mass storage device 712 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 may further read information from the mass storage device 712 by detecting the physical states or characteristics of one or more particular locations within the physical storage units.

In addition to the mass storage device 712 described above, the computer 700 might have access to other computer-readable media to store and retrieve information, such as program modules, data structures, or other data. It should be appreciated by those skilled in the art that computer-readable media can be any available media that may be accessed by the computer 700, including computer-readable storage media and communications media. Communications media includes transitory signals. Computer-readable storage media includes volatile and non-volatile, removable and non-removable storage media implemented in any method or technology. For example, computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information. Computer-readable storage media does not include transitory signals.

The mass storage device 712 may store an operating system 716 utilized to control the operation of the computer 700. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized. The mass storage device 712 may store other system or application programs and data utilized by the computer 700, such as the order processing module 116, which was described above.

In one embodiment, the mass storage device 712 or other computer-readable storage media may be encoded with computer-executable instructions that, when loaded into the computer 700, transform the computer from a general-purpose computing system into a special-purpose computer capable of implementing the embodiments described herein. These computer-executable instructions transform the computer 700 by specifying how the CPUs 702 transition between states, as described above. According to one embodiment, the computer 700 has access to computer-readable storage media storing computer-executable instructions that, when executed by the computer, perform the various routines and operations described herein.

The computer 700 may also include an input/output controller 718 for receiving and processing input from a number of input devices, such as a keyboard, a mouse, a touchpad, a touch screen, an electronic stylus, or other type of input device. Similarly, the input/output controller 718 may provide output to a display device, such as a computer monitor, a flat-panel display, a digital projector, a printer, a plotter, or other type of output device. It will be appreciated that the computer 700 may not include all of the components shown in FIG. 7, may include other components that are not explicitly shown in FIG. 7, or may utilize an architecture completely different than that shown in FIG. 7.

Based on the foregoing, it should be appreciated that technologies for coordinating distributed order execution have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A system for coordinating distributed order execution, the system comprising:

a computer-readable storage medium storing an execution registry, the execution registry defining one or more execution types that are excluded from executing and data indicating attributes that are prohibited from being modified with respect to an item in an order for one or more combinations of an execution type and an execution state, the item offered for sale by an online merchant;

a computer-readable storage medium storing an order store, the order store including one or more execution references associated with the item in the order, wherein individual execution references comprise data identifying an execution type and an execution state of an execution associated with the item; and an order processing system operative to process and fulfill orders for purchases of items received from customers, the order processing system comprising one or more computer systems configured to execute an order processing module, the order processing module configured to receive a request, from an external third-party system separate from the order processing system, to start an execution with respect to the item, wherein the execution is related to one or more of a fulfillment of the item, a payment associated with the item, or a canceling of the item from an order, the external third-party system utilizing one or more other computer systems to perform one or more external executions with respect to the item in the order, and in response to receiving the request, from the external third-party system,
determine that the execution, by the external third-party system, is not excluded from executing with respect to the item based, at least in part, upon the execution registry and the one or more execution references associated with the item,
grant the request to the external third-party system to start the execution,
create an item execution reference for the execution associated with the item,
set an execution state associated with the item execution reference to a pending state,
store, within the order store, the item execution reference,
receive, from the external third-party system, a request to update the execution state associated with the item execution reference to a state that is different from the pending state, and
cause the execution state to be set to the state that is different from the pending state without use of a two-phase database commit protocol.

2. The system of claim 1, wherein the order processing module is further configured to allow the execution state to be updated until the states in one of a completed state or a canceled state.

3. The system of claim 2, wherein the external third-party system periodically updates the execution state in the created execution reference according to a directed acyclic graph.

4. The system of claim 1, wherein the execution registry further defines one or more attributes of an item excluded from modification for one or more combinations of an execution type and an execution state, and wherein the order processing module is further configured when executed to:
receive a request to modify an attribute associated with the item from the external third-party system;
determine that the attribute can be modified based, at least in part, upon the execution references for the item and the execution registry; and
grant the request to modify the attribute associated with the item in response to determining that the attribute can be modified.

5. A computer-implemented method, executing on one or more processors of a computing device, for coordinating distributed order execution, the computer-implemented method comprising:
receiving a request at an order processing system, from an external third-party system separate from the order processing system, to start an execution with respect to an item, wherein the execution is related to one or more of a fulfillment of the item, a payment associated with the item, or a canceling of the item from an order, the external third-party system utilizing one or more other computer systems to perform one or more external executions with respect to the item in the order, wherein the order processing system is operative to process and fulfill orders for purchases of items received from customers; and
in response to receiving the request, from the external third-party system,
determining that the execution, by the external third-party system, is not excluded from executing with respect to the item based, at least in part, upon an execution registry and one or more execution references associated with the item, wherein the execution registry defines one or more execution types that are excluded from executing and data indicating attributes that are prohibited from being modified with respect to an item in an order for one or more combinations of an execution type and an execution state, the item offered for sale by an online merchant, wherein individual execution references of the one or more execution references comprise data identifying an execution type and an execution state of an execution associated with the item,
granting the request to the external third-party system to start the execution,
creating an item execution reference for the execution associated with the item,
setting an execution state associated with the item execution reference to a pending state,
storing, within an order store, the item execution reference,
receiving, from the external third-party system, a request to update the execution state associated with the item execution reference to a state that is different from the pending state, and
causing the execution state to be set to the state that is different from the pending state without use of a two-phase database commit protocol.

6. The computer-implemented method of claim 5, further comprising:
determining that the execution can be started based, at least in part, upon the one or more execution references for the item and the execution registry.

7. The computer-implemented method of claim 5, wherein the item has one or more attributes associated therewith, and wherein the execution registry further defines one or more attributes that cannot be modified for one or more combinations of execution types and execution states.

8. The computer-implemented method of claim 7, further comprising:
receiving a request to modify an attribute associated with the item;
in response to receiving the request to modify the attribute, determining that the attribute cannot be modified based, at least in part, upon the execution references for the item and the execution registry; and
denying the request to modify the attribute associated with the item in response to determining that the attribute cannot be modified.

9. The computer-implemented method of claim 5, wherein individual execution references further specify an execution identifier (ID) that identifies a system associated with the execution associated with the item.

10. The computer-implemented method of claim 9, wherein the execution state in the execution reference is periodically updated by the system associated with the execution.

11. The computer-implemented method of claim 10, wherein the system associated with the execution updates the execution state in the execution reference according to a state machine.

12. The computer-implemented method of claim 11, wherein the state machine comprises a directed acyclic graph.

13. A non-transitory computer-readable storage medium having computer-executable instructions stored thereupon which, when executed by the computer, cause the computer to:

receive a request at an order processing system, from an external third-party system separate from the order processing system, to start an execution with respect to an item, wherein the execution is related to one or more of a fulfillment of the item, a payment associated with the item, or a canceling of the item from an order, the external third-party system utilizing one or more other computer systems to perform one or more external executions with respect to the item in the order, wherein the order processing system is operative to process and fulfill orders for purchases of items received from customers; and in response to receiving the request, from the external third-party system, determine that the execution, by the external third-party system, is not excluded from executing with respect to the item based, at least in part, upon an execution registry and one or more execution references associated with the item, wherein the execution registry defines one or more execution types that are excluded from executing and data indicating attributes that are prohibited from being modified with respect to an item in an order for one or more combinations of an execution type and an execution state, the item offered for sale by an online merchant, wherein individual execution references of the one or more execution references comprise data identifying an execution type and an execution state of an execution associated with the item;

grant the request to the external third-party system to start the execution, create an item execution reference for the execution associated with the item, set an execution state associated with the item execution reference to a pending state, store, within an order store, the item execution reference, receive, from the external third-party system, a request to update the execution state associated with the item execution reference to a state that is different from the pending state, and cause the execution state to be set to the state that is different from the pending state without use of a two-phase database commit protocol.

14. The computer-readable storage medium of claim 13, wherein individual execution references further specify an execution identifier (ID) that identifies a system associated with the execution associated with the item.

15. The computer-readable storage medium of claim 13, further comprising creating a new execution reference for the execution granted the request to begin.

16. The computer-readable storage medium of claim 15, wherein a system is configured to perform the execution granted the request to begin and wherein the system periodically updates an execution state associated with the execution.

17. The computer-readable storage medium of claim 16, wherein the execution state is updated according to a state machine.

18. The computer-readable storage medium of claim 17, wherein the state machine comprises a directed.

* * * * *